United States Patent [19]

Quisenberry et al.

[11] Patent Number: 5,566,062

[45] Date of Patent: *Oct. 15, 1996

[54] POWER CONTROL CIRCUIT FOR IMPROVED POWER APPLICATION AND TEMPERATURE CONTROL OF THERMOELECTRIC COOLERS

[76] Inventors: Tony M. Quisenberry, 67 Remington Dr., Highland Village, Tex. 75067; Roger S. DeVilbiss, 4401 Caruth Blvd., Dallas, Tex. 75225

[*] Notice: The term of this patent shall not extend beyond the expiration date of Pat. No. 5,371,665.

[21] Appl. No.: 330,424

[22] Filed: Oct. 28, 1994

Related U.S. Application Data

[63] Continuation of Ser. No. 212,147, Mar. 14, 1994, Pat. No. 5,371,665.

[51] Int. Cl.⁶ .............................. H02M 5/42; H02P 5/34
[52] U.S. Cl. ........................................... 363/89; 318/800
[58] Field of Search .................................. 363/78, 79, 80, 363/84, 89; 62/3.2, 3.3; 219/482, 490, 494, 497; 607/96, 98; 318/800

[56] References Cited

U.S. PATENT DOCUMENTS

| | | | |
|---|---|---|---|
| 2,416,152 | 2/1947 | Braun | 165/185 |
| 2,713,655 | 7/1955 | Grubman | 165/185 |
| 3,584,291 | 6/1971 | Budnick et al. | 323/236 |
| 3,612,970 | 10/1971 | Sofan | 318/721 |
| 4,187,535 | 2/1980 | Wigley et al. | 363/16 |
| 4,301,658 | 11/1981 | Reed | 62/3.7 X |
| 4,459,468 | 7/1984 | Bailey | 219/490 |
| 4,587,563 | 5/1986 | Bendell et al. | 62/3.2 |
| 4,833,888 | 5/1989 | Kerner et al. | 62/3.3 |
| 4,844,072 | 7/1989 | French et al. | 128/400 |
| 4,935,864 | 6/1990 | Schmidt et al. | 363/141 |
| 5,030,898 | 7/1991 | Hokanson et al. | 318/146 |
| 5,035,052 | 7/1991 | Suzuki et al. | 29/890.046 |
| 5,043,560 | 8/1991 | Masrelies | 219/497 |
| 5,097,829 | 3/1992 | Quisenberry | 128/400 |
| 5,128,517 | 7/1992 | Bailey et al. | 219/506 |
| 5,128,854 | 7/1992 | Raets | 363/89 |
| 5,172,689 | 12/1992 | Wright | 128/400 |
| 5,174,121 | 12/1992 | Miller . | |
| 5,190,032 | 3/1993 | Zacol | 128/400 |
| 5,197,294 | 3/1993 | Galvan et al. | 62/3.62 |
| 5,213,152 | 5/1993 | Cox | 62/3.3 |

FOREIGN PATENT DOCUMENTS

| | | |
|---|---|---|
| 4036210 | 5/1992 | Germany . |
| 0188855 | 11/1982 | Japan . |

*Primary Examiner*—Matthew V. Nguyen
*Attorney, Agent, or Firm*—Jenkens & Gilchrist, P.C.

[57] ABSTRACT

A power control circuit for improved temperature control of thermoelectric devices to maintain the temperature of thermoelectric devices at a set point. The circuit includes an electrical power source; a rectifying device to provide rectified alternating current from the electrical power source; a comparator device; circuitry for providing a predetermined voltage to the inverting input of the comparator device derived from the rectified alternating current; a sensor device to monitor the temperature associated with the thermoelectric device; circuitry for providing an adjustable DC voltage to the non-inverting input of the comparator; a programmable control device to receive an output from the sensor device and provide an output to the circuitry for providing an adjustable DC voltage; a switching device connected between the thermoelectric device and the rectified alternating current; and control circuitry which is coupled between the switching device and the output of the comparator device and is controlled by the output of the comparator device, the control circuitry activates and deactivates the switching device to apply power to the thermoelectric device when the operating temperature of the thermoelectric device is different than the set point temperature to maintain the thermoelectric device at the set point temperature with minimum variations therefrom. A push-pull transistor configuration is used with the "pulse positioning" power supply allowing bi-polar control of thermoelectric device assemblies.

12 Claims, 3 Drawing Sheets

POWER CONTROL CIRCUIT FOR IMPROVED POWER APPLICATION AND TEMPERATURE CONTROL OF THERMOELECTRIC COOLERS

This application is a continuation of application Ser. No. 08/212,147, filed Mar. 14, 1994, now U.S. Pat. No. 5,371,655.

BACKGROUND OF THE INVENTION

1. Field of the Invention

The present invention relates to thermoelectric cooling devices. More particularly, but not by way of limitation, the present invention relates to a power supply and control circuit incorporating an improved design for supplying power to thermoelectric cooling devices and improved temperature control of the thermoelectric cooling devices.

2. History of the Prior Art

The development of thermoelectric cooling (TEC) devices has revolutionized the cooling industry. Conventional cooling has typically required the expansion and compression of gases, such as Chloroflorocarbons (CFC's) and Hydrochloroflorocarbons (HCFC's) to effect the absorption of heat for lowering the temperature of a fluid flowing in association therewith. Unfortunately, these substances are damaging to the earth's ozone layer and are being phased out in future years. The development of solid state cooling systems in the form of TEC devices, has permitted small commercial packages to be developed that are capable of precise temperature control in a variety of applications where environmental concern, size, weight, performance, and noise are at issue.

The most typical TEC device incorporates a thermoelectric module/component that utilizes electrical current to absorb heat from one side of the module and dissipate the heat on the opposite side. If the current direction is reversed, so is the heat pumping. Generally, cold sides and hot sides are developed necessitating an effective means of removing or adding heat from or to a solid, liquid or a gas (typically air).

An example of such an application of a TEC device is seen in U.S. Pat. No. 5,097,829 (the '829 patent) for a temperature controlled cooling system. In this patent, the advantages of medically therapeutic cooling of a wound site on a body are discussed. Initial use of cooling therapy was mainly found in the field of orthopedics. It is now found that post surgical cooling is highly beneficial in the reduction of trauma to the patient. It also increases the rate of healing and reduces the length of a hospital stay. In addition, cooling therapy is also being used in home health care for chronic pain control and to increase joint flexibility and facilitate the rate of healing.

Numerous non TEC prior art devices have been proposed for reducing the temperature of a body part in order to achieve the beneficial results obtained thereby. For example, ice packs have long been used to reduce swelling and achieve some of these benefits. In addition, cold packs containing two chemicals, which when mixed together absorb heat (endothermic reactions), have also been used. Alternately, and more expensively, cooling pads are used through the application of a compressor, refrigerant condensing and evaporator coils. Such devices are very inconvenient and contain many inherent disadvantages.

A problem associated with the applications of very cold surfaces, such as that of an ice pack, directly to a body part is its effect on the skin. The temperature of the ice pack is very cold and can only be left against the skin for a short period of time. Generally, leaving the ice pack against the skin longer than thirty minutes can result in damage to the skin. It is much more desirable to be able to apply a temperature in a range between fifty and fifty-five degrees, which is relatively comfortable to the skin, and maintain that temperature for a substantial number of days. This prolonged application insures that the body part is cooled to the inner depth of the bone or tissue of the traumatized area. With an ice pack, cooling only takes place in the subdural area. In a more precisely controlled temperature application, cooling can take place at a deep penetration for an extended period. Thus, it is highly desirable to be able to maintain precise control of the temperature which is actually contacting the tissue of a wound site and then sustain that temperature for a substantial period of time. In this manner, the advantages obtained from the use of cold therapy in a medical application can be vastly increased. This can be done with TEC devices as shown in the '829 patent. It would be advantageous to improve the temperature control of thermoelectric cooling devices while reducing the number of parts and reducing the cost of providing improved temperature control.

One of the most ubiquitous problems in the area of industrial control is that of temperature regulation. Variations in ambient temperature, process loading, and power input must all be accounted for in such a manner that the controlled system will reach an equilibrium point in a reasonable time, and oscillations in temperature will be minimized. There are two generally used control methods or systems to accomplish this end: Thermostatic Control and Proportional-Integral-Derivative (PID) control.

The simplest method or system is thermostatic control which is exemplified by a typical home thermostat. In this system, full power is applied to the thermal generator until the desired set point is reached, whereupon the power is removed and the system "coasts" back below the set point. This system is characterized by temperature fluctuations above and below the set point but is extremely economical to implement.

The second method or system is PID and is the most common form of industrial temperature control. In this method, the output of the thermal generator is regulated in a linear fashion, such that just enough power is supplied to the load to make up for losses in the system. The amount of power applied to the load is computed from three factors, hence the term PID. The first factor is the proportional term, which is a measure of the error at any particular instant. This temperature error is multiplied by the proportional gain factor and applied in a direction such as to reduce the total error. The second factor is the integral term which is simply the time integral of the temperature error. The integral term is used to "help" the proportional term in driving the temperature error to zero. The third factor is the derivative term and is calculated as the rate of change of the temperature and is used as a "brake" on the other two terms when the temperature i s changing rapidly. These three terms are added algebraically to give the final power input value to the thermal generator. This system is capable of giving excellent temperature control where the heat load is essentially constant but requires that the temperature be known to a high degree of resolution in order to make use of the various gain terms. This system cannot regulate temperature to the degree of resolution needed for many thermoelectric systems.

The present invention provides an improvement over the prior art by providing a smooth DC voltage for the thermoelectric cooling devices and eliminates the use of bulky inductors or transformers, does not operate at high frequencies typical of switching power supplies and maintains a low part count. In addition, the improved temperature control algorithm provides tighter control as compared to a PID controller.

SUMMARY OF THE INVENTION

One aspect of the present invention thus comprises an improved temperature control fluid circulating system for automatically cooling a blanket or pad with a thermoelectric cooling device. The improvement comprises the pulse positioning of power to a filter capacitor and the thermoelectric cooling device to apply the required DC voltage across the thermoelectric cooling device to maintain a set temperature.

Another aspect of the present invention comprises an improved direct current power supply controller scheme utilizing a standard alternating current input voltage. The "pulse positioning" scheme places a high current transistor in the conduction mode when the nominal voltage across the load is below the desired voltage. When the high current transistor is in the non-conducting state, a filter capacitor supplies the current to the thermoelectric cooling device, thus providing a non-isolated DC current to the thermoelectric cooling device.

Another aspect of the present invention comprises a power control circuit for improved temperature control of thermoelectric coolers to maintain the temperature of thermoelectric coolers at a set point. The circuit includes an electrical power source; a rectifying device to provide rectified alternating current from the electrical power source; a comparator device; circuitry for providing a predetermined voltage to the inverting input of the comparator device derived from the rectified alternating current; a sensor device to monitor the temperature associated with the thermoelectric cooler; circuitry for providing an adjustable DC voltage to the non-inverting input of the comparator; programmable control device to receive an output from the sensor device and provide an output to the circuitry for providing an adjustable DC voltage, the value of the output being determined by the difference between the temperature of the thermoelectric cooler and the set point temperature; a switching device connected between the thermoelectric cooler and the rectified alternating current; and control circuitry which is coupled between the switching device and the output of the comparator device and is controlled by the output of the comparator device, the control circuitry activates the switching device to apply power to the thermoelectric cooler when the operating temperature of the thermoelectric cooler is above the set point temperature as indicated by the output of the comparator device and deactivating the switching device when the operating temperature is below the set point temperature to maintain the thermoelectric cooler at the set point temperature with minimum variations therefrom.

Another aspect of the present invention comprises a push-pull high power transistor configuration used in conjunction with the programmable control means and the "pulse positioning" power supply allowing bi-polar control of thermoelectric device assemblies for cooling and heating.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Although this invention is applicable to the supplying of power and controlling temperature in liquid-to-air thermoelectric heat exchanger applications such as cooling lasers, plasma etch equipment, cooling rotary evaporators, and general laboratory cooling; air-to-air applications such as air conditioning, refrigeration, portable cool/hot boxes and dehumidification; thermally conductive solid-to-air heat exchangers such as thermal cyclers used in DNA amplification or thermal cycling of electronic components; and servo motor control, this invention has been found particularly useful in the environment of cold therapy. Therefore, without limiting the applicability of this invention to "supplying power and controlling temperature in cold therapy", this invention will be described in such environment.

Figure 1:
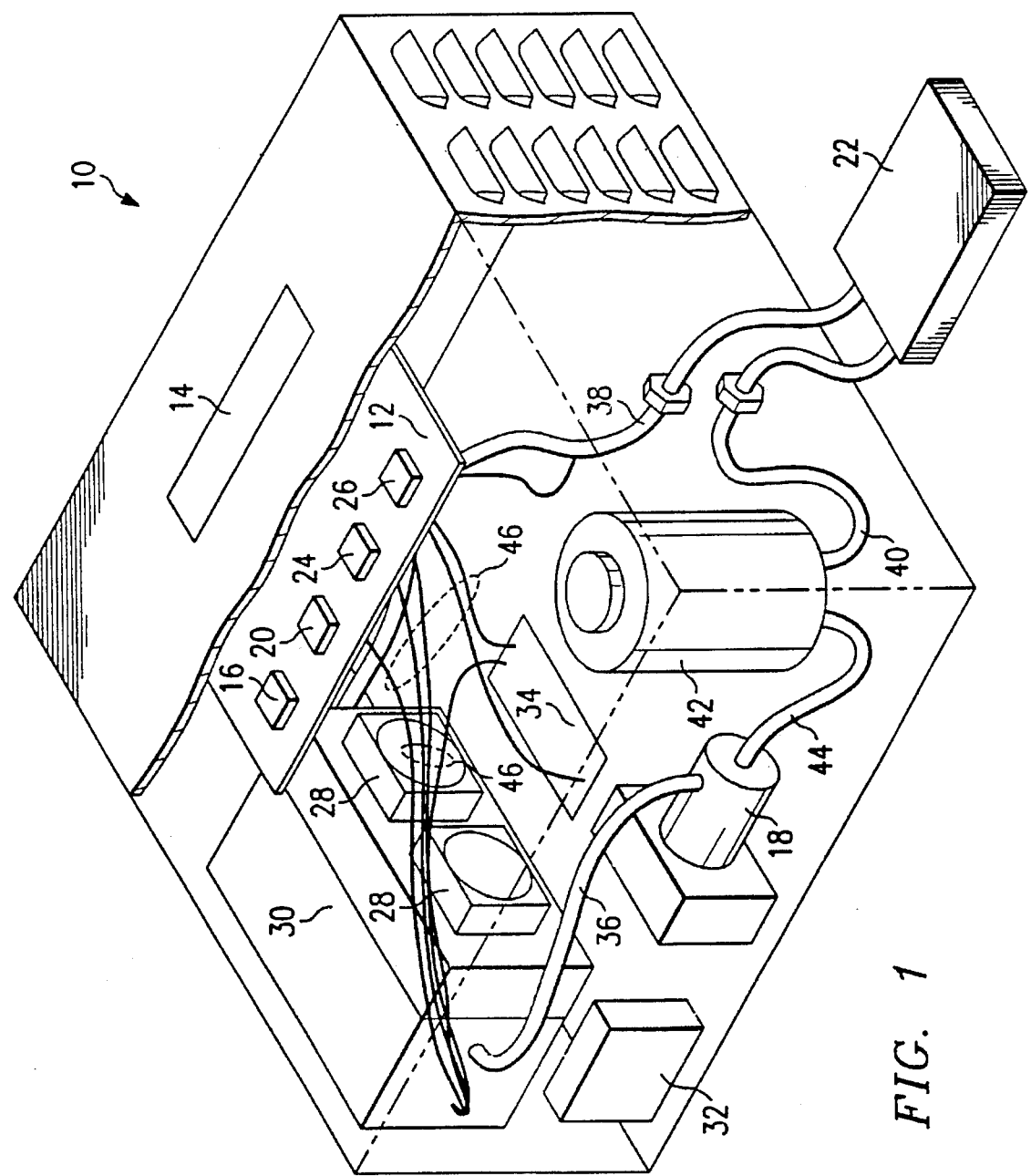
FIG. 1 is a perspective view of a thermoelectric cooling device heat exchanger shown in conjunction with a temperature controlled fluid circulating system for use in cooling applications.

Referring to FIG. 1, there is shown one example of a temperature controlled fluid circulating system 10 which can be used for cold therapy applications and which incorporates the present invention. The temperature controlled fluid circulating system 10 includes a microprocessor based control board or card 12, a LCD display 14, and user interface buttons or pads 16, 20, 24, 26 for operator control of the system 10. Button or pad 16 is used to start and/or stop pump 18. Button or pad 20 is used to display the actual liquid temperature output to blanket or cooling pad 22. Button or pad 24 is depressed to increase the set-point temperature and button or pad 26 is depressed to decrease the set-point temperature. Pump 18 circulates the coolant to and from the blanket or cooling pad 22. Fans 28 force air across fins of the cooling banks (not shown) removing the heat from the TEC device assembly 30. Power supply 32 provides DC voltage to control board or card 12.

Regarding hose connections, hose 36 sends the coolant from pump 18 to TEC device assembly 30. Hose 38 sends the coolant from the TEC device assembly 30 to the blanket or cooling pad 22. Return hose 40 sends the coolant to reservoir 42 and hose 44 sends the coolant from reservoir 42 to pump 18.

Appropriate electrical connections are provided between various elements by wires 46 wherein single lines may represent a plurality of wires for purposes of clarity.

Figure 2:
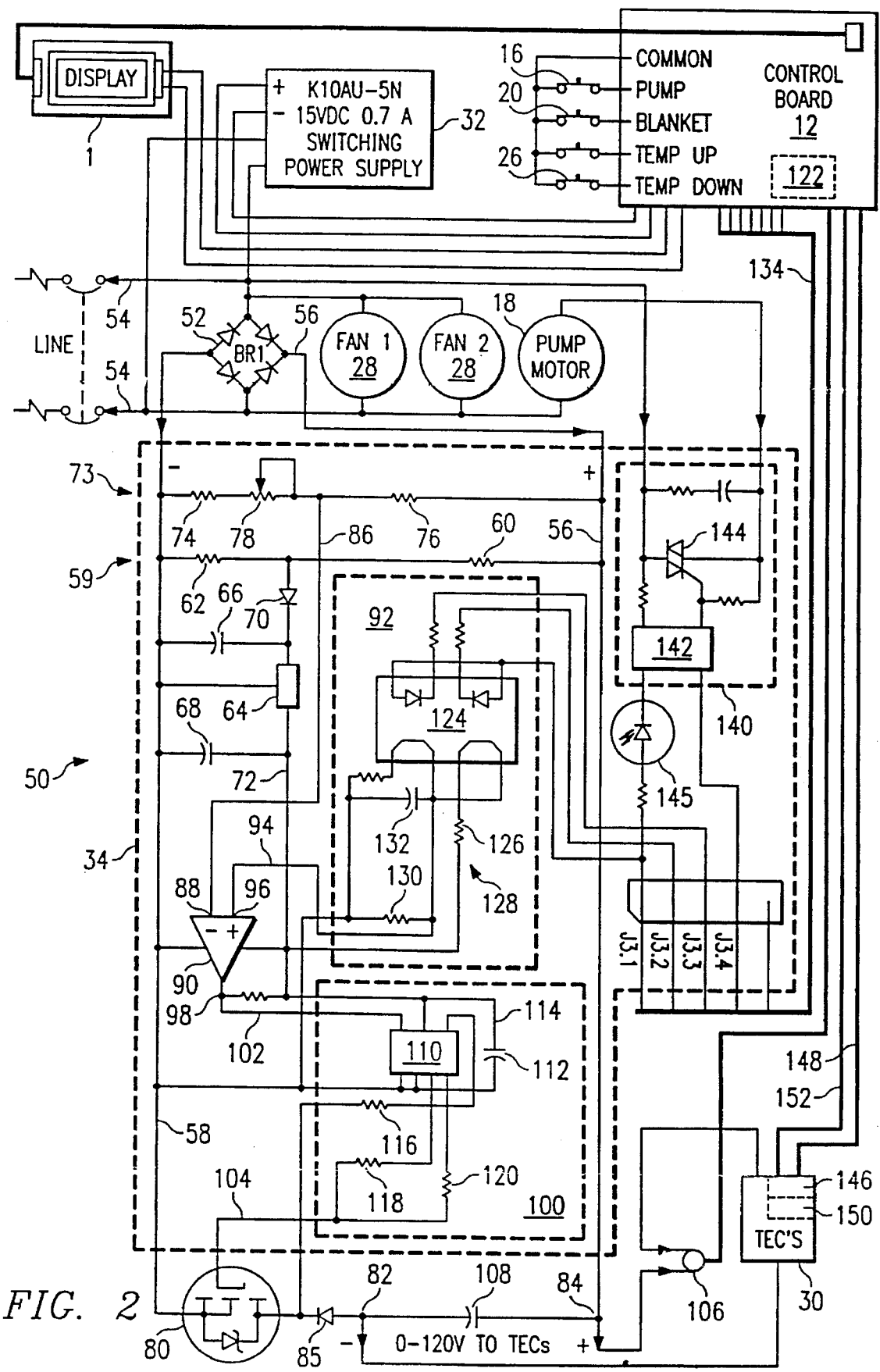
FIG. 2 is an electrical diagram of the temperature controlled fluid circulating system embodying the present invention.

Referring now to FIG. 2, the power control circuit 50 comprises a power source in the form of a bridge rectifier 52 and power control board or circuitry 34. A standard AC input voltage 54 (115 volts AC @60 Hz) is applied to the input of bridge rectifier 52 which provides about 103 volts DC with about 50 volts rms AC at its output across lines 56 and 58. It will be appreciated that the AC input voltage can be 115 volts AC @400 Hz, 220 volts AC @50–60 Hz (single phase or three phase ) with the proper interface elements, if required. A voltage divider 59 comprising resistors 60 and 62 across lines 56 and 58 provides voltage regulator 64 and filter capacitors 66 and 68 with power through protection diode 70 such that the output of voltage regulator 64 is at a predetermined level of about 12 volts DC on line 72.

A second voltage divider 73 comprising resistors 74 and 76 and variable potentiometer 78 across lines 56 and 58 is tuned by varying potentiometer 78 to provide the maximum desired voltage across the TEC device assembly (TEC'S) 30 or the maximum desired on-time (maximum pulse position) for the high current transistor (an FET) 80. In the disclosed embodiment, TEC's comprise ten 12 volt units so potentiometer 78 is varied such that the voltage across terminals 82 and 84 (across the TEC's) is 120 volts DC when the system is operating. Protection diode 85 is connected between terminal 82 and high current transistor 80. If the number of TEC units and the voltage rating thereof are different, then the voltage across terminals 82 and 84 would be different. The output from voltage divider 73 is applied via line 86 to the inverting input 88 of comparator 90.

Figure 3:
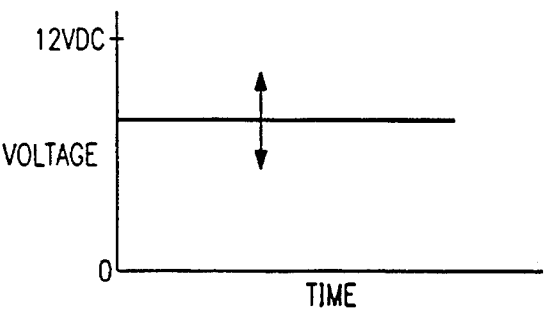
FIG. 3 is a view of the waveform of the adjustable DC reference signal applied to the comparator of the present invention.
Figure 4:
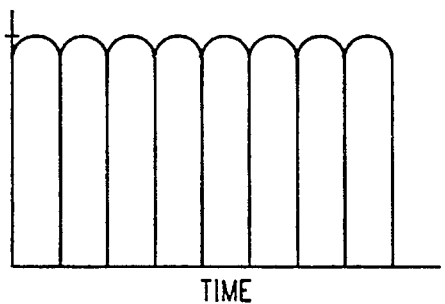
FIG. 4 is a view of the waveform of the signal applied to the inverting input of the comparator of the present invention.
Figure 5:
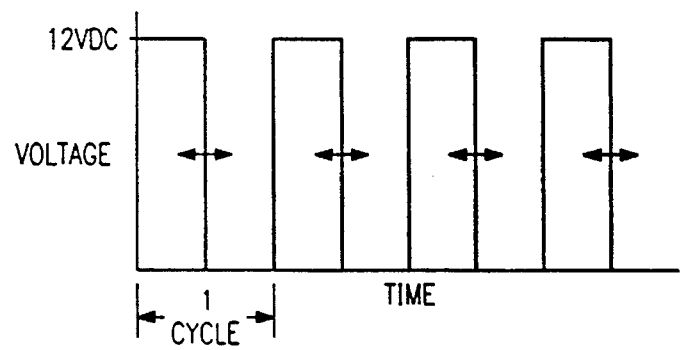
FIG. 5 is a view of the waveform of the pulse position output to the high current transistor of the present invention.

The control signal which is output from the pulse positioning control circuit 92 is applied via line 94 to the non-inverting input 96 of comparator 90 and is used to adjust the control output 98 from comparator 90 which is input to the transistor control network 100 via line 102. The control signal is adjustable (see FIG. 3) by the pulse positioning control circuit 92 from about zero volts DC to about 12 volts DC and is compared to the output from voltage divider 73 (see FIG. 4). The control output 98 of comparator 90, which is constant in value but is variable in width, is provided to the transistor control circuit 100 which provides the high current transistor 80 with "pulse positioning" control (i.e. specifying when the high current transistor 80 is conducting or not conducting) on line 104. The pulse position output on line 104 to high current transistor 80 is shown in FIG. 5. The trailing edge of the pulse varies in position as the width of the pulse changes. As previously noted, the output from voltage divider 73 is adjustable such that you can tune the maximum voltage across the thermoelectrics to the appropriate Vmax of the thermoelectric system.

When the pulse positioning control circuit 92 reduces the non-inverting input of comparator 90 to 0 volts DC, the high current transistor 80 is turned off. As the non-inverting DC signal is increased, the pulse positioning time is increased (the width of the pulse to the high current transistor 80 is increased). The predetermined voltage (about 12 VDC) applied to the inverting input 88 of comparator 90 is tied to the fully rectified input waveform, and when compared to the non-inverting input 96 provides pulses which are variable in width. The high current transistor 80 is turned on until the desired nominal voltage occurs across terminals 82 and 84 which is necessary to maintain the temperature or amount of heat pumping. The voltage across terminals 82 and 84 is applied across TEC'S 30 through the hall effect current sensor 106. The output of the hall effect current sensor 106 is provided to control board 12 for safety purposes. Once at the desired voltage, the high current transistor 80 is turned off and the filter capacitor 108 provides the power to the TEC'S 30 for the balance of the cycle.

The high current transistor 80 is in the conduction state when the voltage at terminals 82 and 84 (across TEC'S 30 in series with the hall effect current sensor 106) is at or below the nominal voltage that is desired for the amount of heat pumping required. The high current transistor 80 is not conducting when the voltage at terminals 82 and 84 is above the desired voltage level. When the high current transistor 80 is not conducting, capacitor 108 supplies the appropriate amount of current for the balance of the cycle such that the TEC'S 30 see a DC voltage with less than a 5% ripple.

Transistor control network 100 comprises a FET driver and protection device 110 (an SI9910) which will protect the comparator circuitry 90 if the high current transistor 80 fails. Capacitor 112 is a filter capacitor for the 12 volts DC applied to the FET driver and protection device 110 via line 114. The "pulse positioned" control output 98 from comparator 80 is input to FET driver and protection device 110 which provides the proper output to the high current transistor 90 to control the conduction thereof. Resistor 116 is provided to sense any overvoltage condition and turn off the high current transistor 80 before damage occurs to the high current transistor 80. Resistors 118 and 120 provide impedance matching to ensure that the proper signal is seen at the high current transistor 80.

The pulse positioning control circuit 92 interfaces the control signal from the programmable control means 122 in control board 12 to the comparator 90 and comprises an opto-isolator 124, resistor 126 which is a pull-up resistor to 12 volts DC and filter 128 comprising resistor 130 and capacitor 132. The programmable control means 122 in control board 12 comprises a microprocessor and appropriate software and outputs a pulse width modulated (PWM) 0 to 5 volts DC control signal which is input to the power control board 34 on terminals J 3.2 and J 3.3 via line or cable 134. The PWN 0 to 5 volts DC control signal is passed through opto-isolator 124 whereupon it is transformed to a 0 to 12 volt DC signal by filter 128 and resistor 126 and is applied via line 94 to the non-inverting input 96 of comparator 90.

In operation, temperature sensor 146 provides a signal over line 148 to control board 12 and programmable control means 122. If the temperature sensed by temperature sensor 146 rises above a predetermined value, programmable control means 122 sends a predetermined signal to the pulse positioning control circuit 92 which converts that signal to the proper level of DC voltage and transmits that signal to the non-inverting input 96 of comparator 90. The control output 98 from comparator 90 is sent to the transistor control network 100 which then sends a proper signal to the high current transistor 80 to control the conduction thereof to bring the temperature of the TEC's back down to the desired temperature.

Included on power control board 34 is pump control circuitry 140 which comprises a Triac driver 142 (IC 128) for controlling the operation of Triac 144 for turning the pump motor on and off. Control signals from programmable control means 122 in control board 12 enter the power control board 34 on terminals J 3.1 and J 3.4 via line or cable 134 to control the Triac driver 142. Triac driver 142 controls the Triac 144 to allow current to pass through Triac 144 and pump motor 18 to turn on pump motor 18 or to not allow current to pass through Triac 144 and maintain the pump motor 18 off. LED 145 provides a visual indication of the on or off condition of pump 18.

Figure 6:
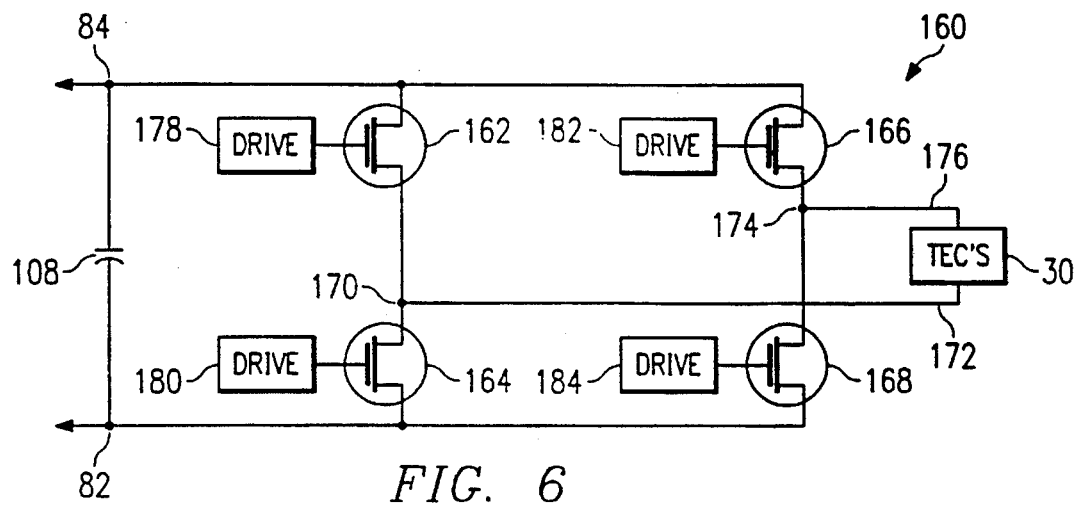
FIG. 6 is an electrical diagram of bi-polar control of a TEC device assembly utilizing the present invention.

Referring now to FIG. 6, a push-pull configuration 160 is disclosed for bi-polar control of a TEC device assembly (TEC's) 30 utilizing the present "pulse positioning" invention. High current transistors 162 and 164 are connected in series across terminals 82 and 84. High current transistors 166 and 168 are connected in series across terminals 82 and 84. Terminal 170 between transistors 162 and 164 is connected to one side of TEC's 30 by line 172. Terminal 174 between transistors 166 and 168 is connected to the other side of TEC's 30 by line 176. Drive circuit 178 provides a control input to transistor 162 while drive circuit 180 provides a control input to transistor 164. Drive circuit 182 provides a control input to transistor 166 while drive circuit 184 provides a control input to transistor 168. All the drive circuits are controlled by inputs from the programmable control means 122. When using the TEC's 30 for heating purposes, transistors 162 and 168 are placed in the conduction mode while transistors 164 and 166 are placed in the non-conduction mode. When using the TEC's 30 for cooling purposes, transistors 164 and 166 are placed in the conduction mode while transistors 162 and 168 are placed in the non-conduction mode. It will be appreciated that the programmable control means 122 controls and coordinates the drive signals to the transistors as well as the application of the voltage across terminals 82 and 84 as previously described with reference to FIG. 2.

The unique control strategy is called "Adaptive Thermostatic" (AT). The goal of this control strategy is to allow temperature to be controlled to the limits of the system resolution, with simple and readily available parts. In particular, it allows a system with 8 bit resolution, such as is commonly found on microprocessors, to provide the control of a system using up to 10 bits with a conventional PID. In practice, the AT control strategy will typically regulate temperature to −0, +1 bits of control system resolution, whereas the PID technique will only regulate to −4, +4 bits of system resolution typically.

The new control strategy AT begins its cycle as a simple PID controller until the temperature of the controlled device (TEC'S 30) reaches a region near the final desired setting. At this point the power control circuitry transitions to full AT operation. During startup, two output values are established, a low target and a high target output drive. The difference between these two values is fixed, typically at 0.5% to 1.0% of the control output range. As the PID portion of control is seeking a set point, these two target values are modified. In the case of a cooling device, if the output temperature is above the set point, the low target is modified downwards, "dragging" the high target along so as to maintain a constant difference between the two targets. If the output temperature is below the set point, the high target is modified upwards, "dragging" the low value along. At the point of convergence, the control targets are not modified any further, and the controller functions as a Thermostatic controller, except that instead of applying full power to the load, a value is applied that is slightly greater than that required to bring the temperature back down, and when the load temperature is below the set point, a value is applied which is lower than that required to maintain the desired output temperature. Since the system shuttles back and forth between these two discrete values, it may be considered as Thermostatic operation, however the discrete values are not zero and 100%, but rather are two values only slightly different from each other. This has several advantages. First, the error is very tightly controlled, since the control system does not have to wait for a large integral error to build up in order to effect a control power change. Also, since the two discrete values closely bound the theoretical perfect power output, undershoot and overshoot are practically non-existent. Also for TEC type thermal generators, it is desirable to have the applied voltage be as constant as possible, in order to maximize the device life expectancy. This is promoted by the small changes in control output voltage.

Using temperature sensors 146 mounted on the cold manifold (not shown) of the heat exchanger of TEC'S 30 and temperature sensors 150 mounted on the heat sinks (not shown) of the heat exchanger, temperature readings are provided to the microprocessor based control board or card 12. The programmable control means 122 then controls the value of the control signal (through the pulse positioning control circuit 92) to the non-inverting input 96 of comparator 90, thereby controlling the high current transistor 80 and the power applied to the TEC'S 30.

The programmable control means 122 monitors and controls the internal system diagnostics such as monitoring equipment performance or component failures, fan control, clean filter, loose connector warnings, over temperature and under temperature alarms and cooling fluid flow rate alarms. The microprocessor is connected to display 14 which outputs status and alarm information, thereby simplifying operation. In addition, audible, logic output, and visual displays are provided which allows the operator quick knowledge of a problem and shut down or ancillary systems such that damage will not occur to either the cooling system or the device being cooled.

Internal system diagnostics for monitoring the TEC'S performance are contained in the system. The input current to the TEC'S are monitored using "Hall Effect" silicon sensors which have the power leads of the TEC'S passing therethrough. This provides current flow information for the microprocessor based system diagnostics. If the sensor detects a short or open circuit condition, the TEC'S and the pump are locked out of operation and a "Call for Service/FET Short" or "Call for Service/TEC Open" message is provided. The display message is latched on until the power is turned off to the instrument.

Over-heating of the system is monitored and controlled through a comparator circuit which compares the ambient temperature with the heat sink (of the TEC'S) temperature and causes an audible alarm if the heat sink temperature rises past a pre-set alarm limit and a display message of "Clean Filters/Turn Machine Off".

Fluid leak fault detection is provided by a drip sensor in the base of the system. If there are plumbing leaks, excessive condensation, or spills into the system, the sensor will send a signal to the microprocessor which shuts down the TEC power and the pump motor. The display provides the user with a "Call for Service/Internal Leak" message.

Fluid manifold detection uses an active temperature sensor that feeds back temperature information to the microprocessor for temperature control and alarm indications. An audible alarm indicates that the temperature of the liquid manifold is at a set minimum temperature, such as 39° F., so that the operator knows that the set point has been reached. The default low temperature limit is 34° F. to protect the system if water is used as the coolant.

Utilizing the heat sink and ambient temperatures, the fan speed is controlled to minimize acoustical noise and still provide adequate air flow over the fins of the heat sink. This feature minimizes noise and reduces power consumption by the system.

Low water level sensors monitor the liquid level such that inadequate or intermittent flow conditions do not occur. An "Add Fluid" message is displayed for the operator when this condition occurs.

A pressure sensor monitors the pressure in the fluid path verifying that the pump is working correctly and that there are no obstructions restricting the flow. If the pressure sensor is tripped, an alarm "Check Fittings" is displayed, and the pump and cooling system are shut down.

It is thus believed that the operation and construction of the present invention will be apparent from the foregoing description. While the apparatus shown or described has been characterized as being preferred it will be obvious that various changes and modifications may be made therein without departing from the spirit and scope of the invention as defined in the following claims.

What is claimed is:

1. A power control system for a device requiring direct current voltage to maintain a set point, said power control system comprising:

an electrical power source for supplying alternating current;

rectifying means for acting on said alternating current to produce rectified alternating current;

comparator means having an inverting input, a non-inverting input and an output;

means for providing a predetermined voltage to the inverting input of said comparator means from said rectified alternating current;

sensor means operatively positioned to monitor an output associated with said device;

means for providing an adjustable DC voltage to the non-inverting input of said comparator;

control means to receive an output from said sensor means and provide an output to said means for providing an adjustable DC voltage, the value of said output being determined by the difference between the sensed output of said device and the desired output of said device;

switching means operatively connected between the device and said rectified alternating current; and control means operatively coupled between said switching means and the output of said comparator means, said control means activates said switch means for a predetermined time, determined by the output from said comparator, to allow the rectified alternating current to reach a desired voltage across said device at which time said control means deactivates said switch means, wherein the value of the desired voltage is determined by the set point.

2. The system as set forth in claim 1 wherein said electrical power source is about 115 volts AC @60 Hz.

3. The system as set forth in claim 1 wherein said electrical power source is about 115 volts AC @400 Hz.

4. The system as set forth in claim 1 wherein said electrical power source is about 220 volts AC @50–60 Hz.

5. The system as set forth in claim 1 wherein said rectifying means comprises a bridge rectifier.

6. The system as set forth in claim 1 wherein said means for providing a predetermined voltage to the inverting input comprises a voltage divider.

7. The system as set forth in claim 1 wherein said means for providing an adjustable DC voltage to the non-inverting input comprises an opto-isolator operatively coupled to a pull-up resistor and a filter.

8. The system as set forth in claim 1 wherein said sensor means comprises a sensor operatively positioned with respect to said device and providing an input to the control means.

9. The system as set forth in claim 8 wherein said control means comprises a microprocessor and associated software.

10. The system as set forth in claim 1 wherein said switching means comprises a high current transistor connected in series with said rectified alternating current and said device.

11. The system as set forth in claim 10 further including a capacitor connected in parallel with said device to supply power to said device when said high current transistor is not activated.

12. The system as set forth in claim 1 wherein said control means comprises an FET driver and a protection device.

* * * * *